United States Patent [19]
Berg

[11] Patent Number: 6,163,399
[45] Date of Patent: Dec. 19, 2000

[54] METHOD AND APPARATUS FOR SUPPRESSING TRANSIENTS IN OPTICAL AMPLIFIERS

[75] Inventor: Loren Scott Berg, Kanata, Canada

[73] Assignee: Nortel Networks Limited, Montreal, Canada

[21] Appl. No.: 09/207,028

[22] Filed: Dec. 8, 1998

[51] Int. Cl.[7] .................................................. H01S 03/00
[52] U.S. Cl. ........................................ 359/341; 359/124
[58] Field of Search .................................... 359/341, 124

[56] References Cited

U.S. PATENT DOCUMENTS

| | | | |
|---|---|---|---|
| 5,703,711 | 12/1997 | Hamada | 359/341 |
| 5,923,462 | 7/1999 | van der Plaats | 359/341 |
| 6,008,935 | 12/1999 | Fujita et al. | 359/341 |
| 6,025,947 | 2/2000 | Sugaya et al. | 359/160 |
| 6,038,063 | 3/2000 | Tsuda et al. | 359/341 |

*Primary Examiner*—Mark Hellner

[57] ABSTRACT

The invention is a transient suppression system for use with an optical amplifier having a specifiable total output optical power. The system measures the power in a filtered electronic version of WDM signals carrying information channels at both the input and the output of the amplifier. By attenuating very low-frequency and very high-frequency components of the converted optical signals, it is possible to obtain an accurate estimate of the aggregate power of the information channels without bias due to amplified spontaneous emissions or optical service channels. The output power estimate is divided by the input power estimate to give an estimate of the gain of the information channels, which is compared to a reference gain. The larger the difference, the greater the applied change in the output optical power of the amplifier. Under transient conditions, the input power estimate will change, causing a corresponding change in the estimated gain which is then used to control the specified value of the total optical gain fed to the optical amplifier. In this way, a constant signal gain can be maintained during transient conditions, such as when optical channels are added or dropped by upstream components in a WDM network.

31 Claims, 1 Drawing Sheet

METHOD AND APPARATUS FOR
SUPPRESSING TRANSIENTS IN OPTICAL
AMPLIFIERS

FIELD OF THE INVENTION

The present invention relates to fiber optical amplification systems and, in particular, to methods and apparatus for suppressing the effects of transients in such systems.

BACKGROUND OF THE INVENTION

In the field of fiber optic communications, it has been known for some time to increase the capacity of an optical communications link by propagating wavelength-division multiplexed (WDM) optical signals along optical fibers. Specifically, a WDM signal is composed of a plurality of distinct wavelengths of light, each such wavelength carrying a respective optical information signal, also known as an information "channel". The number of wavelengths (i.e., information channels) in a WDM signal is a system parameter and usually ranges from 2 to 128 (in the case of "dense" WDM, or DWDM).

As the WDM signal travels through an optical network, it gradually fades and must be amplified at various points along its route. Because of the large number of wavelengths that can be carried by a single WDM signal, and also due to the high data rates of the individual information channels, amplification is best performed by purely optical means.

Suitable candidate components for achieving optical amplification are rare earth doped-fiber amplifiers, such as erbium doped-fiber amplifiers (EDFAs). In an EDFA, it is possible to set the total output power level of the amplifier to a desired value, thereby to establish a relationship between the power of a WDM input signal entering the EDFA and the power of a WDM output signal exiting the EDFA. This also establishes a gain relationship for the information channels passing through the EDFA.

Ideally, the gain applied by the EDFA to the information channels remains at a constant value. However, transients caused by the instantaneous addition or removal of one or more individual optical information channels by an upstream add-drop multiplexer (ADM) or other device will affect the power of the WDM input signal. Although the EDFA instantaneously reacts to such a change in input power by providing a corresponding change in output power, thereby maintaining a constant gain for a brief amount of time, a natural recovery process is initiated soon thereafter by the EDFA, whereby the specified total output power eventually becomes redistributed among the new number of wavelengths (or information channels).

Clearly, in the case of a channel being dropped by an upstream ADM, the effect of this transient will be an eventual increase in gain for the remaining information channels as the EDFA settles into steady-state operation. Conversely, in the case of an optical information channel being added by an upstream device, the specified total output power becomes shared (possibly unevenly) among the now larger number of wavelengths, leading to a decrease in gain for the information channels as the EDFA reaches a steady state.

In order to suppress transients and thereby maintain a constant gain for the information channels, it would appear plausible to monitor the power of the WDM input signal and that of the WDM output signal, calculate the ratio of the two and keep the ratio at a constant value via a feedback mechanism involving the specifiable output power level of the EDFA.

However, this approach neglects the fact that in addition to carrying the information channels, the WDM input and output signals carry one or more optical service channels (OSCS) and the WDM output signal further contains amplified spontaneous emissions (ASE), from which it follows that the aforementioned ratio poorly represents the gain of the information channels alone. This results in poor transient suppression and errors in gain control, leading to a degradation in the quality of the information channels reaching downstream components of the fiber optic network.

SUMMARY OF THE INVENTION

It is an object of the present invention to mitigate or obviate one or more disadvantages of the prior art.

The invention may be summarized as a transient suppression system for use with an optical amplifier connected between an input fiber and an output fiber. The transient suppression system comprises input power estimation means connectable to the input fiber, output power estimation means connectable to the output fiber and processing means connected to the input and output power estimation means and to the control port of the optical amplifier.

The input power estimation means estimates the power of the optical input signal in a frequency range having a lower limit greater than zero frequency, thereby creating an input power estimate, while the output power estimation means estimates the power of the optical output signal in that frequency range, thereby creating an output power estimate. The processing means then calculates the control gain as a function of the output and input power estimates.

BRIEF DESCRIPTION OF THE DRAWINGS

The preferred embodiment of the present invention will now be described with reference to FIG. 1, which shows in block diagram form an optical amplifier and an inventive transient suppression system for use therewith.

DETAILED DESCRIPTION OF THE PREFERRED EMBODIMENT

Figure 1:
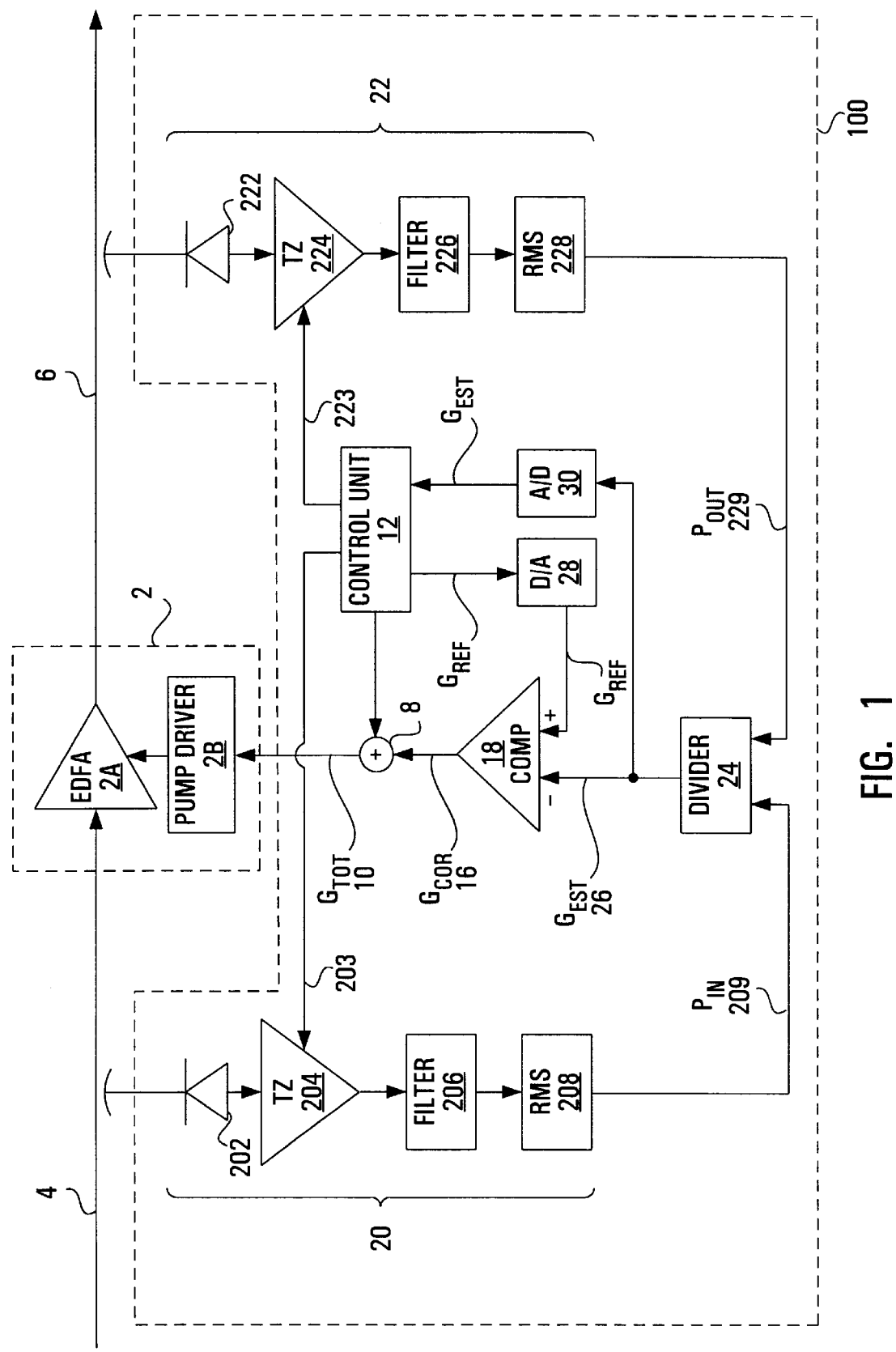

Referring to FIG. 1, there is shown an optical amplifier (OA) 2 and an inventive transient suppression system 100 connected thereto. The OA 2 preferably comprises an erbium doped-fiber amplifier (EDFA) 2A, a laser (not shown) for pumping light into the EDFA 2A at a certain frequency and power and a pump driver 2B. An input optical signal, preferably a WDM input signal, is carried on an input signal line 4 which enters an input port of the OA 2. As would be understood by those skilled in the art, the EDFA 2A within the OA 2 amplifies the WDM input signal by stimulated emission of photons and an amplified WDM output signal emerges on an output signal line 6 connected to an output port of the OA 2.

The amplification level provided by the EDFA 2A is controllable by providing a target output power level $G_{TOT}$ to the pump driver 2B. The invention consists of generating a suitable value of the target output power level $G_{TOT}$ which changes in response to transients in order to suppress them. To this end, the transient suppression system 100 comprises an input measurement path 20 and an output measurement path 22 respectively intercepting the input and output signal lines 4 6.

Measurement path 20 consists of a series connection of an optical detector 202, a transimpedance amplifier 204, a filter 206 and an RMS-to-DC converter 208. Similarly, measurement path 22 comprises an optical detector 222, a transimpedance amplifier 224, a filter 226 and an RMS-to-DC converter 228 connected in series.

The optical detectors 202,222 are preferably PIN photodiodes, which are wideband converters used for diverting a small portion (approximately 5%) of the optical intensity of the respective WDM signal and converting it to (analog) electronic form. The transimpedance amplifiers 204,224, which are optional, are analog components used for scaling the analog electronic signal produced by the corresponding PIN photodiode 202,222 so as to provide the corresponding filter 206,226 with an analog electronic signal in a suitable voltage range. The output voltage range of each transimpedance amplifier 204,224 is controllable via a respective control signal on a respective control line 203,223 leading from a common control unit 12, such as a microprocessor or the like.

It is a key feature of the present invention to provide an accurate estimate of the aggregate DC power of the information channels in the WDM input and output signals. Conventional power estimates consider the region at and near DC, but in addition to capturing the DC power of the information channels, this type of estimate also includes a component due to optical service channels (OSCs), amplified spontaneous emissions (ASEs) and other sources of noise. Clearly, therefore, the region near zero frequency cannot be relied upon for an accurate estimate of the power of the information channels only.

Furthermore, since an EDFA is known to behave in a distortive manner below about 10 kHz, it is exceedingly inappropriate to rely on signal components in that frequency range when attempting to estimate the DC power of any signal and, in this case, the aggregate of the information channels. In view of the above, it is preferable that filters 206,226 attenuate the spectral region below about 10 kHz.

Moreover, a desirable (although not absolutely essential) characteristic of the filters 206,226 is a relatively narrow pass band of 100 or so kilohertz (kHz), which enhances a particular frequency range that contains useful information insofar as power estimation of the aggregate information channels is concerned. By way of example, if the WDM input and output signals contain a narrowband signal in the 10–120 kHz range which has a power or amplitude that is proportional to the DC power of the information channels, then it would be advantageous for the filters 206,226 to have a pass band between 10 kHz and 120 kHz. The concept of using narrowband signals for power estimation is revisited in further detail hereinbelow.

Another advantage of having a high-frequency cutoff at around 120 kHz is that optical service channel data, which may be in the megahertz range, is attenuated, leading to an even more reliable power estimate of the aggregate information channels. Although not absolutely necessary, the frequency range of the filters 206,226 is identical.

Having regard to RMS-to-DC converter 208, its role is to accept the filtered signal from filter 226 and to produce an estimate, denoted $P_{IN}$, of the power contained therein. Similarly, RMS-to-DC converter 228 takes the filtered signal from filter 226 and derives an estimate thereof, denoted $P_{OUT}$. It should be appreciated that the RMS-to-DC converters 208,228 perform coarse power estimates and need not perform exact root-mean-square calculations in the academic sense of the expression. Accordingly, in one embodiment, each RMS-to-DC converter 208,228 may simply comprise a square law detector followed by an integrator.

In addition to the input and output measurement paths 20,22 just described and the control unit 12 briefly touched upon, the inventive transient suppression system shown in FIG. 1 also comprises a divider circuit 24, a comparator 18 and a summation circuit 8. The divider circuit 24 is connected to the RMS-to-DC converters 208,228 via respective signal lines 209,229 and produces an estimated gain $G_{EST}$ from $P_{OUT}$ and $P_{IN}$, which estimated gain $G_{EST}$ is fed to a first input of the comparator 18 on a signal line 26. The estimated gain $G_{EST}$ is also fed to the control unit 12 via an analog-to-digital converter 30.

Furthermore, the control unit 12 is also connected to a second input of the comparator 18 via a digital-to-analog converter 28, for supplying a reference gain $G_{REF}$ to the comparator 18. The comparator 18 subtracts the estimated gain $G_{EST}$ from the reference gain $G_{REF}$, may scale the result and produces a correction gain $G_{COR}$ fed to the summation circuit 8 via a control line 16. The summation circuit 8 accepts a nominal gain $G_{NOM}$ fed from the control unit 12 on control line 14 and adds the nominal gain $G_{NOM}$ to the correction gain $G_{COR}$ in order to produce the aforementioned total output power level $G_{TOT}$.

It is desirable to implement the filters 206,226, the RMS-to-DC converters 208,228, the divider circuit 24, the comparator 18 and the summation circuit 8 using analog electronic circuits since such components are generally faster than their digital counterparts, thereby allowing a quicker system response time when faced with a transient. Nevertheless, it is within the scope of the present invention to provide digital circuits for any or all of these components.

As alluded to above and as will be established hereinbelow when describing operation of the inventive transient suppression system, it is highly desirable that each individual information channel in the WDM input signal carried on the input signal line 4 be modulated by a narrowband analog signal having an amplitude that is a fraction of the DC power of that optical information channel. Each such so-called analog "dither" signal is preferably in the frequency range between 10 kHz to 120 kHz. More generally, it is preferred that the frequency range of the analog dither signal match the pass band of the filters 206,226.

A known technique for modulating an optical signal with an analog dither signal having an amplitude proportional to the DC power of that optical signal is described in U.S. Pat. No. 5,513,029 (Roberts). It is to be noted that if this or a similar dithering technique is used for one information channel in a WDM signal, maximum benefit is obtained when it is used for all information channels.

Operation of the invention, and in particular of the input measurement path 20, is now described with continued reference to FIG. 1. PIN photodiode 202 intercepts the input signal line 4 and converts the WDM input signal into analog electronic form. The output of PIN photodiode 202 is a wideband electronic representation of the aggregate information channels as well as any optical service channels and noise present in the WDM input signal.

The output of PIN photodiode 202 is fed to the transimpedance amplifier 204, whose output dynamic range is adjustable by the control circuit 12 via control line 203. (Control of the dynamic range of the transimpedance amplifiers 204,224 is described in more detail further on.) Assuming for now that the appropriate dynamic range for the transimpedance amplifier 204 has been chosen, its output is filtered by the filter 206.

As previously discussed, the filter 206 has a dual functionality, one of which is to enhance the signal in a given frequency band of interest. In this case, the 10–120 kHz band is very useful, since the power level of each individual information channel is related to the power of an analog dither signal deliberately placed in the 10–120 kHz band.

Since all wavelength dependency among information channels is surrendered after conversion of the WDM input signal into electronic form by PIN photodiode 202, the 10–120 kHz band of the signal fed to filter 206 contains an aggregate analog dither signal from all of the information channels together. Therefore, if dithering is used for one information channel, the highest degree of accuracy of any subsequent power estimate of the aggregate information channels is attained if an analog dither signal is also present on the other information channels.

Another function of filter 206 is the removal of portions of the frequency spectrum which cannot be used to obtain an accurate estimate of the power of the information channels. The existence of energy in the filtered signal will therefore primarily be due to the information channels (and the analog dither signals, if present).

RMS-to-DC converter 208 then measures the power contained in the 10–120 kHz region of the filtered signal spectrum, which produces an accurate estimate $P_{IN}$ of the power of the aggregate information channels in the WDM input signal. This estimate $P_{IN}$ is then fed by RMS-to-DC converter 208 to the divider circuit 24 along signal line 209.

Operation of the output measurement path 22 is similar to operation of the input measurement path 20 just described. That is to say, PIN photodiode 222 converts part of the WDM output signal on the output signal line 6 into analog electronic form, which is translated into a suitable voltage range by transimpedance amplifier 224 and fed to filter 226. For now, it is assumed that transimpedance amplifier 224 has the same output voltage range as does transimpedance amplifier 204.

Filter 226 then applies a band pass response which necessarily removes low-frequency components and, if applicable, enhances the 10–120 kHz frequency band (or any other band that may be used for dither signals). As discussed, while the upper bound on the frequency range of filter 226 may be useful for cutting out optical service channels (which may be in the megahertz range), the lower bound principally removes much of the amplified spontaneous emissions (ASE) and attenuates the regions of the spectrum which do not give a reliable indication of the DC power.

RMS-to-DC converter 228 then estimates the power in the filtered signal. If an analog dither signal is present in the passband of filter 206, then the power estimate $P_{OUT}$ will be a very accurate estimate of the overall DC power in the information channels alone. $P_{OUT}$ is fed to the divider circuit 24 on signal line 229.

Operation of the divider circuit 24, comparator 18, summation circuit 8 and control unit 12 is now described. First, the divider circuit 24 divides $P_{OUT}$ by $P_{IN}$ to produce the estimated gain $G_{EST}$ that is fed to the comparator 18 on signal line 26. Next, the comparator subtracts the estimated gain $G_{EST}$ from the reference gain $G_{REF}$ to produce the correction gain $G_{COR}$. If the value of the correction $G_{COR}$ is close to zero (i.e., if $G_{EST}$ is approximately equal to $G_{REF}$) and has remained that way for a considerable amount of time, then the system is said to be in a "steady state", otherwise the system is said to be undergoing transient operation.

Steady state conditions prevail when the number of information channels in the WDM input signal is constant, implying that the number of information channels in the WDM output signal remains constant and that the estimated gain $G_{EST}$ also remains constant. Furthermore, the nominal gain $G_{NOM}$ and the reference gain $G_{REF}$ supplied by the control circuit 12 remain constant, which means that the target output power level $G_{TOT}$ remains at a constant level.

Incidentally, it is noteworthy that $G_{EST}$ equals the actual aggregate gain of the information channels only when the output voltage ranges of the transimpedance amplifiers 204,224 are identical. Otherwise, the estimated gain $G_{EST}$ is related to the actual gain by a multiplicative constant expressing the difference between the two voltage ranges. Of course, the same applies to $G_{REF}$, which represents the desired gain only when the output voltage ranges of the transimpedance amplifiers 204,224 are identical and which must be adjusted by the control unit 12 when said ranges are different.

In fact, when the transient suppression system 100 is in a steady state, it is a function of the control unit 12 to monitor the estimated gain $G_{EST}$ (via the A/D converter 30) and attempt to bring it close to unity by choosing appropriate voltage ranges for the transimpedance amplifiers 204,224 through control lines 203,223. This ensures that each transimpedance amplifier is efficiently utilizing its available dynamic range. Therefore, it is expected that $G_{EST}$ (and therefore $G_{REF}$) will often be different from the actual (or desired) aggregate gain for the information channels, but will be translatable thereto by a multiplicative constant.

When the number of information channels in the WDM input signal changes, a transient is said to occur. Firstly, it is supposed that an information channel is dropped somewhere upstream. Instantaneously, the power of the WDM input signal drops and, as a natural consequence of the behaviour of the OA 2, the power of the WDM output signal drops as well. Long before the OA 2 has time to recover from this transient, a reduction in the input power $P_{IN}$ is measured by the input measurement path 20 and a reduction in the output power $P_{OUT}$ is measured by the output measurement path 22.

Since both $P_{IN}$ and $P_{OUT}$ have dropped, the estimated gain $G_{EST}$ remains relatively constant, as does the target output power level $G_{TOT}$. However, as the OA 2 begins its recovery process, it begins to divide the total output power level specified by $G_{TOT}$ among the now smaller number of wavelengths in the WDM output signal on the output signal line 6. Thus, an increase in the aggregate power of the information channels on the WDM output signal is registered by the output measurement path 22 as an increase in $P_{OUT}$, which leads to an increase in the estimated gain $G_{EST}$.

Since $G_{EST}$ is now larger than $G_{REF}$, the comparator 18 outputs a negative value for $G_{COR}$, which the summation circuit 8 adds to the nominal gain $G_{NOM}$, thereby to produce a somewhat smaller value for $G_{TOT}$. In response, the OA 2 lowers its output power and the feedback loop is complete. As can be appreciated, this feedback mechanism has the effect of maintaining the estimated gain $G_{EST}$ of the aggregate information channels as close to the value $G_{REF}$ as possible. (As discussed, the reference gain $G_{REF}$ will depend not only on the desired gain of the information channels, but also on difference in the output voltage ranges chosen by the control unit 12 for the transimpedance amplifiers 204,224.) It is possible, and indeed preferable, to design the transient suppression system such that it reacts to a transient and reaches a steady state within 100 microseconds or less. This is sufficient to suppress most expected optical signal transients.

It is to be understood that an opposite effect occurs when an information channel is added by an upstream component, resulting in an increase in the power of the WDM input signal. Although the OA 2 reacts by instantaneously increasing the power of the WDM output signal, its natural tendency is to begin redistributing the target output power level $G_{TOT}$ among the (now larger) number of information channels. This is perceived as a reduction in $P_{OUT}$, causing the estimated gain $G_{EST}$ to fall and the correction gain $G_{COR}$ to become positive. Through this feedback mechanism, the target output power level $G_{TOT}$ is increased and the estimated gain $G_{EST}$ is brought back to the reference gain $G_{REF}$, as desired, and a new steady state is reached.

After the transient suppression system reaches a new steady state following the suppression of a transient, it is possible that the total input or output optical power may have changed enough to warrant re-calibration of the output voltage ranges of the (optional) transimpedance amplifiers 204,224. Proper calibration of the transimpedance amplifier ranges is assured by programming the control unit 12 to constantly monitor the estimated gain $G_{EST}$ on signal line 26 and to adjust the tramsimpedance amplifier control signals on control lines 203,223 so as to render (or keep) $G_{EST}$ relatively close to unity, if possible. The response time of this second feedback loop is preferably on the order of seconds (or even slower), once steady-state conditions have been attained.

Finally, it may be desirable to tune the nominal gain $G_{NOM}$ supplied by the control unit 12 to the summation circuit 8 on control line 14 using yet another, even slower feedback loop. Such tuning may serve to respond to long-term changes in the anticipated input and output optical power being handled by the OA 2 and the transient suppression system 100.

While the preferred embodiment of the present invention has been described and illustrated, it will be apparent to one skilled in the art that numerous modifications and variations are possible. For example, the pass band of the filters 206,226, preferably identical for both filters, is allowed to differ from the suggested range of 10–120 kHz and still be within the scope of the invention. This particular range was chosen to cooperate with an analog dither signal present in the specified range and, naturally, the presence of an analog dither signal at other frequencies will justify a change in the preferred pass band of the filters 206,226.

Furthermore, any known technique for power estimation can be used by the RMS-to-DC converters 208,228, while the divider circuit 24 can be replaced by a sampler and a digital look-up table to avoid having to perform an actual division in real time. Also, other known optoelectronic conversion means can be used instead of the PIN photodiodes 202,222 to obtain an electronic signal proportional to the optical signal under consideration.

Finally, although use of the estimated gain $G_{EST}$ to vary the target output power level (or control gain) of an optical amplifier has been described, it is to be understood that other uses for the estimated gain $G_{EST}$ can be contemplated while remaining within the scope of the invention. For example, it may be desirable to simply obtain and monitor an accurate estimate of the gain of the information channels passing through an optical amplifier without necessarily attempting to stabilize it.

In view of the many further conceivable variations of the present invention, its scope is only to be limited by the claims appended hereto.

I claim:

1. A transient suppression system for use with an optical amplifier connected to an input fiber carrying an input optical signal and to an output fiber carrying an output optical signal and having a control port, the output optical signal having a total optical power which is specifiable by a control gain fed to the control port, the system comprising:
   input power estimation means connectable to the input fiber, for estimating the power of the optical input signal in a frequency range having a lower limit greater than zero frequency, thereby to create an input power estimate;
   output power estimation means connectable to the output fiber, for estimating the power of the optical output signal in said frequency range, thereby to create an output power estimate; and
   processing means connected to the input and output power estimation means and to the control port of the optical amplifier, for calculating the control gain as a function of the output and input power estimates;
   wherein the processing means comprises:
      an analog divider circuit connected to the input and output power estimation means, for calculating a ratio of the output power estimate to the input power estimate;
      a comparator connected to the divider circuit for calculating the difference between said ratio and a reference gain, thereby to produce a correction gain; and
      a summation circuit connected to the comparator and to the control port of the optical amplifier, for adding said correction gain to a nominal gain, thereby to produce said control gain.

2. A system according to claim 1 wherein said frequency range has a lower limit of approximately 10 kHz and an upper limit of approximately 120 kHz.

3. A system according to claim 1, further comprising a control unit connected to the comparator, for receiving said ratio and for producing said reference gain therefrom.

4. A system according to claim 1, further comprising a control unit connected to the summation circuit, for supplying said nominal gain.

5. A system according to claim 4, further comprising a control unit connected to the summation circuit, for supplying said nominal gain.

6. A transient suppression system for use with an optical amplifier connected to an input fiber carrying an input optical signal and to an output fiber carrying an output optical signal and having a control port, the output optical signal having a total optical power which is specifiable by a control gain fed to the control port, the system comprising:
   input power estimation means connectable to the input fiber, for estimating the power of the optical input signal in a frequency range having a lower limit greater than zero frequency, thereby to create an input power estimate;
   output power estimation means connectable to the output fiber, for estimating the power of the optical output signal in said frequency range, thereby to create an output power estimate; and
   processing means connected to the input and output power estimation means and to the control port of the optical amplifier, for calculating the control gain as a function of the output and input power estimates;
   wherein the input power estimation means comprises a PIN diode connectable to the input fiber, an electronic filter connected to the PIN diode and RMS-to-DC converter connected to the electronic filter.

7. A system according to claim 2, wherein the input power estimation means comprises a PIN diode connectable to the input fiber, an electronic filter connected to the PIN diode and RMS-to-DC converter connected to the electronic filter.

8. A system according to claim 6, wherein the electronic filter is an analog filter.

9. A system according to claim 6, wherein the RMS-to-DC converter comprises a square-law device connected to an integrator.

10. A system according to claim 6, wherein the input power estimation means further comprises a transimpedance amplifier having an input connected to the PIN diode and an output connected to the filter, for producing a signal at the output which is proportional to a signal at the input and is in a voltage range controllable by a transimpedance control signal.

11. A system according to claim 10, further comprising a control unit connected to the transimpedance amplifier and to the processing means, for receiving said ratio and for producing the transimpedance control signal and the reference gain in accordance with said ratio.

12. A system according to claim 6, wherein the output power estimation means comprises a PIN diode connectable to the output fiber, an electronic filter connected to the PIN diode and an RMS-to-DC converter connected to the electronic filter.

13. A system according to claim 2, wherein the output power estimation means comprises a PIN diode connectable to the output fiber, an electronic filter connected to the PIN diode and RMS-to-DC converter connected to the electronic filter.

14. A system according to claim 7, wherein the output power estimation means comprises a PIN diode connectable to the output fiber, an electronic filter connected to the PIN diode and RMS-to-DC converter connected to the electronic filter.

15. A system according to claim 12, wherein the electronic filter is an analog filter.

16. A system according to claim 12, wherein the RMS-to-DC converter comprises a square-law device connected to an integrator.

17. A system according to claim 12, wherein the output power estimation means further comprises a transimpedance amplifier having an input connected to the PIN diode and an output connected to the filter, for producing a signal at the output which is proportional to a signal at the input and is in a voltage range controllable by a transimpedance control signal.

18. A system according to claim 17, further comprising a control unit connected to the transimpedance amplifier and to the processing means, for receiving said ratio and for producing the transimpedance control signal and the reference gain in accordance with said ratio.

19. A method of suppressing transients in a fiber optic amplifier producing an output optical signal from an input optical signal and having a specifiable total output power level, comprising the steps of:

converting the input optical signal into an input electrical signal;

estimating the D.C. power of the input electrical signal based on its frequency content in a frequency range which excludes D.C., thereby to create an input D.C. power estimate;

converting the output optical signal into an output electrical signal;

estimating the power of the output electrical signal based on its frequency content in said frequency range;

dividing the output D.C. power estimate by the input D.C., thereby to produce an estimated gain;

comparing the estimated gain to a reference gain, thereby to produce a correction gain; and adjusting the total output power level of the amplifier as a function of the correction gain.

20. A transient suppression system for use with an optical amplifier connected to an input fiber carrying an input optical signal and to an output fiber carrying an output optical signal, said amplifier having a control port, wherein the output optical signal has a total optical power which is specifiable by a control gain fed to the control port, the system comprising:

a first opto-electronic converter connectable to the input fiber;

a first electrical filter connected to the first converter, having a pass band which excludes frequencies containing significant amplified spontaneous emissions;

an input D.C. power estimator connected to the first electrical filter;

a second opto-electronic converter connectable to the output fiber;

a second electrical filter connected to the second converter, having a pass band which excludes frequencies containing significant amplified spontaneous emissions;

an output D.C. power estimator means connected to the second electrical filter; and a processing unit connected to the input and output power estimators means and to the control port of the optical amplifier, for determining the control gain as a function of the D.C. power estimates produced by the input and output D.C. power estimators.

21. A system according to claim 20, wherein said frequency range has a lower limit of approximately 10 kHz.

22. A system according to claim 21, wherein said frequency range has an upper limit of approximately 120 kHz.

23. A system according to claim 20, wherein the processing unit comprises:

an analog divider circuit connected to the input and output D.C. power estimators, for calculating a ratio of the output D.C. power estimate to the input D.C. power estimate;

a comparator connected to the divider circuit for calculating the difference between said ratio and a reference gain, thereby to produce a correction gain; and a summation circuit connected to the comparator and to the control port of the optical amplifier, for adding said correction gain to a nominal gain, thereby to produce said control gain.

24. A system according to claim 23, further comprising a control unit connected to the comparator, for receiving said ratio and for producing said reference gain therefrom.

25. A system according to claim 24, further comprising a control unit connected to the summation circuit, for supplying said nominal gain.

26. A system according to claim 20, wherein the input D.C. power estimator comprises an RMS-to-DC converter.

27. A system according to claim 26, further comprising a transimpedance amplifier having an input connected to the first opto-electronic converter and an output connected to the first electrical filter, for producing a signal at its output which is proportional to a signal at its input and is in a voltage range controllable by a transimpedance control signal.

28. A system according to claim 27, further comprising a control unit connected to the transimpedance amplifier and to the processing unit, for receiving said ratio and for producing the transimpedance control signal and the reference gain in accordance with said ratio.

29. A system according to claim 26, wherein the output D.C. power estimator comprises an RMS-to-DC converter.

30. A system according to claim 29 further comprising a transimpedance amplifier having an input connected to the second opto-electronic converter and an output connected to the second electrical filter, for producing a signal at its output which is proportional to a signal at its input and is in a voltage range controllable by a transimpedance control signal.

31. A system according to claim 30, further comprising a control unit connected to the transimpedance amplifier and to the processing unit, for receiving said ratio and for producing the transimpedance control signal and the reference gain in accordance with said ratio.

* * * * *